United States Patent
Lu

(10) Patent No.: US 12,332,845 B2
(45) Date of Patent: Jun. 17, 2025

(54) NETWORK ADAPTER AND DATA PROCESSING METHOD OF NETWORK ADAPTER

(71) Applicant: HUAWEI TECHNOLOGIES CO., LTD., Guangdong (CN)

(72) Inventor: Shengwen Lu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 83 days.

(21) Appl. No.: 18/063,359

(22) Filed: Dec. 8, 2022

(65) Prior Publication Data

US 2023/0105771 A1   Apr. 6, 2023

Related U.S. Application Data

(63) Continuation of application No. PCT/CN2021/091376, filed on Apr. 30, 2021.

(30) Foreign Application Priority Data

Jun. 9, 2020   (CN) .......................... 202010519685.6
Sep. 28, 2020  (CN) .......................... 202011038826.9

(51) Int. Cl.
  *G06F 16/174*   (2019.01)
  *G06F 3/06*     (2006.01)

(52) U.S. Cl.
  CPC ........ *G06F 16/1748* (2019.01); *G06F 3/0608* (2013.01); *G06F 3/0641* (2013.01); *G06F 3/067* (2013.01)

(58) Field of Classification Search
  CPC .................................................. G06F 16/1748
  See application file for complete search history.

(56) References Cited

U.S. PATENT DOCUMENTS 9,262,430 B2 *  2/2016  Tal ........................ G06F 16/2255
9,384,093 B1 *  7/2016  Aiello ................... G06F 3/0688
(Continued)

FOREIGN PATENT DOCUMENTS

CN  105068817 A  11/2015
CN  105450588 A   3/2016
(Continued)

OTHER PUBLICATIONS

Extended European Search Report in European Appln No. 21821554.9, dated Oct. 11, 2023, 4 pages.

*Primary Examiner* — Dhairya A Patel
(74) *Attorney, Agent, or Firm* — Fish & Richardson P.C.

(57) ABSTRACT

An example network adapter includes a processor and a hardware processing engine. The processor is configured to obtain a first input/output (I/O) command that indicates to write first data stored in a local server into at least one peer server, and to send first indication information to the hardware processing engine. The first indication information indicates the hardware processing engine to obtain the first data from the local server, and the indication information includes address information and length information that are of the first data and that are stored in the local server. The hardware processing engine is configured to directly process the first data when the first data is obtained from the local server based on the address information and the length information, and send the processed first data to the at least one peer server, where the first data is not stored in a memory of the network adapter.

20 Claims, 8 Drawing Sheets

(56) References Cited

U.S. PATENT DOCUMENTS

| | | | |
|---|---|---|---|
| 10,503,413 B1* | 12/2019 | Gal | G06F 3/0659 |
| 12,014,173 B2* | 6/2024 | Lu | G06F 3/061 |
| 2009/0144389 A1* | 6/2009 | Sakuta | G06F 9/455 |
| | | | 709/215 |
| 2011/0219208 A1 | 9/2011 | Asaad et al. | |
| 2011/0238888 A1 | 9/2011 | Chiu et al. | |
| 2013/0311434 A1 | 11/2013 | Jones | |
| 2016/0062954 A1 | 3/2016 | Ruff et al. | |
| 2016/0342545 A1 | 11/2016 | Arai et al. | |
| 2017/0192701 A1* | 7/2017 | Wang | G06F 3/067 |
| 2018/0067685 A1 | 3/2018 | Deng et al. | |
| 2018/0089297 A1* | 3/2018 | Dong | G06F 16/27 |
| 2018/0157445 A1 | 6/2018 | Gissin et al. | |
| 2018/0307650 A1 | 10/2018 | Kachare et al. | |
| 2019/0163583 A1* | 5/2019 | Fahim | G06F 12/084 |
| 2019/0294366 A1 | 9/2019 | Kawamura et al. | |
| 2020/0065256 A1* | 2/2020 | Palmer | G06F 16/2246 |
| 2020/0328966 A1 | 10/2020 | Wang et al. | |
| 2020/0333944 A1 | 10/2020 | Guo | |
| 2021/0200681 A1 | 7/2021 | Gong et al. | |
| 2021/0382799 A1* | 12/2021 | Kawaguchi | G06F 16/1815 |
| 2022/0083267 A1* | 3/2022 | Chen | G06F 13/4221 |
| 2024/0232872 A1* | 7/2024 | Arneault | G16C 20/20 |

FOREIGN PATENT DOCUMENTS

| | | |
|---|---|---|
| CN | 105808345 A | 7/2016 |
| CN | 106020731 A | 10/2016 |
| CN | 106210041 A | 12/2016 |
| CN | 106775434 A | 5/2017 |
| CN | 108319428 A | 7/2018 |
| CN | 108768851 A | 11/2018 |
| CN | 109218308 A | 1/2019 |
| CN | 109597582 A | 4/2019 |
| CN | 109656855 A | 4/2019 |
| CN | 109962832 A | 7/2019 |
| CN | 110677402 A | 1/2020 |
| CN | 110896406 A | 3/2020 |
| JP | 2008102967 A | 5/2008 |
| JP | 2014153754 A | 8/2014 |
| JP | 2018185814 A | 11/2018 |
| JP | 2019164713 A | 9/2019 |
| WO | 2015121912 A1 | 8/2015 |

* cited by examiner

NETWORK ADAPTER AND DATA PROCESSING METHOD OF NETWORK ADAPTER

CROSS-REFERENCE TO RELATED APPLICATIONS

This application is a continuation of International Application No. PCT/CN2021/091376, filed on Apr. 30, 2021, which claims priority to Chinese Patent Application No. 202011038826.9, filed on Sep. 28, 2020, and Chinese Patent Application No. 202010519685.6, filed on Jun. 9, 2020. All of the aforementioned patent applications are hereby incorporated by reference in their entireties.

TECHNICAL FIELD

This application relates to the field of server technologies, and more specifically, to a network adapter and a data processing method of a network adapter.

BACKGROUND

With the emergence of cloud computing, to reduce usage of a host processor (for example, a central processing unit (CPU)), provide more host CPUs for external sales, or enhance user experience, and prevent a CPU of a user from being affected by more background services of a host, services originally running on the host, for example, a management service, a storage service, and a network service, may be offloaded to a network adapter, and a CPU on the network adapter processes the foregoing services. In this way, the host CPU can almost be fully provided for the user for other uses.

A storage service is used as an example. In a related technical solution, for an input/output (I/O) write command, the network adapter needs to store to-be-written data in the host into a memory of the network adapter, and a processor of the network adapter obtains the data from the memory of the network adapter, performs storage service processing on the data, and writes processed data into a destination storage device. For the I/O read command, the network adapter needs to first store the data obtained from the destination storage device into the memory of the network adapter, and then the processor of the network adapter obtains the data from the memory of the network adapter, performs storage service processing on the data, and writes processed data into the host.

In the foregoing related technical solution, when performing storage service processing on the data, the network adapter needs to repeatedly obtain data from the memory of the network adapter through a bus. This strains the bus of the network adapter. In addition, the network adapter needs a large quantity of memories to store the processed data. Storage and management of the data greatly increase program complexity and resource consumption of the memory of the network adapter.

SUMMARY

This application provides a network adapter, to reduce strains on a bus of the network adapter and consumption of a memory of the network adapter during storage service processing of data.

According to a first aspect, a network adapter is provided, including a processor and a hardware processing engine.

The processor is configured to obtain a first input/output I/O command. The first I/O command indicates to write first data stored in a local server into at least one peer server.

The processor is further configured to send first indication information to the hardware processing engine. The first indication information indicates the hardware processing engine to obtain the first data from the local server. The first indication information includes address information and length information that are of the first data and that are stored in the local server.

The hardware processing engine is configured to: when the first data is obtained from the local server based on the address information and the length information, directly process the first data, and send the processed first data to the at least one peer server. The first data is not stored in a memory of the network adapter.

When obtaining data from a memory of a host, the network adapter directly performs storage service processing on the data, and directly sends the processed data to a destination storage device at a peer end. The data obtained from the memory of the host is not stored in the memory of the network adapter. The processed data is not stored in the memory of the network adapter either, but is directly sent to the destination storage device. In this way, when performing storage service processing on the data, the network adapter does not need to repeatedly obtain data from the memory of the network adapter through a bus. This reduces strains on the bus of the network adapter. In addition, the network adapter does not need a large quantity of memories to store the processed data. This can reduce program complexity and resource consumption of the memory.

In a possible implementation, the first indication information further indicates the hardware processing engine to perform any combination of one or more of the following processing on the first data: data fingerprint computing, data deduplication processing, data encryption, data compression, and data redundancy error correction encoding computing.

The hardware processing engine is configured to: when the first data is obtained from the local server based on the address information and the length information, directly process the first data based on the first indication information.

In another possible implementation, the data redundancy error correction encoding computing may be, for example, erasure code (EC) computing.

In another possible implementation, the first indication information indicates the hardware processing engine to perform fingerprint computing on the first data. The hardware processing engine is configured to perform fingerprint computing on the first data, to obtain fingerprint information corresponding to the first data.

The hardware processing engine is further configured to send the fingerprint information corresponding to the first data to the processor.

The processor is further configured to asynchronously perform deduplication processing based on the fingerprint information corresponding to the first data.

In another possible implementation, the hardware processing engine is configured to: after the first data is processed, place the processed first data into a sending queue of the hardware processing engine, and send the processed first data to the at least one peer server.

The processor is further configured to: if the first data includes duplicate data, send, by using the hardware processing engine, second indication information to a peer server that stores the duplicate data. The second indication information is used to delete the duplicate data.

In another possible implementation, the hardware processing engine is configured to: after the first data is processed, send a notification message to the processor. The notification message is used to notify the processor to send the first data.

The processor is further configured to: when the processed first data is placed into a sending queue of the hardware processing engine, if it is determined that the first data includes duplicate data, skip delivering the duplicate data to the sending queue; or after the processed first data is placed into a sending queue of the hardware processing engine, if it is determined that the first data includes duplicate data, send, by using the hardware processing engine, second indication information to a peer server that stores the duplicate data. The second indication information is used to delete the duplicate data.

In another possible implementation, the first indication information includes a plurality of groups of address information and length information. The processor is further configured to split the first data based on address information and length information that are of the first data and that are stored in the local server, to obtain the plurality of groups of address information and length information.

In another possible implementation, the processed first data includes the processed first data and redundancy error correction data corresponding to the processed first data. The redundancy error correction data is stored in the memory of the network adapter. The processed first data is not stored in the memory of the network adapter.

The hardware processing engine is configured to obtain the redundancy error correction data from the memory of the network adapter, and obtain the processed first data again from the local server.

The hardware processing engine is configured to send the processed first data and the redundancy error correction data to the at least one peer server.

It should be understood that the redundancy error correction data may be obtained by performing data redundancy error correction encoding computing (for example, EC computing) on the processed first data.

In another possible implementation, the processed first data includes the processed first data and redundancy error correction data corresponding to the processed first data. The redundancy error correction data is stored in the memory of the network adapter. The processed first data is stored in a local area of the hardware processing engine.

The hardware processing engine is configured to obtain the redundancy error correction data from the memory of the network adapter, and obtain the processed first data from the local area.

The hardware processing engine is configured to send the processed first data and the redundancy error correction data to the at least one peer server.

In another possible implementation, the processor is further configured to receive a first I/O read response message from a peer server. The first I/O read response message includes second data that the local server needs to obtain from the peer server.

The hardware processing engine is further configured to process the second data, and directly write the processed second data into the local server. The second data is not stored in the memory of the network adapter.

In another possible implementation, the hardware processing engine is further configured to determine to perform any combination of one or more of the following processing on the second data: data decryption and data decompression.

In another possible implementation, the first I/O read response message carries decryption information. The hardware processing engine is configured to determine based on the decryption information and decrypt the second data.

According to a second aspect, a network adapter is provided, including a processor and a hardware processing engine.

The processor is configured to receive a first I/O read response message from a peer server. The first I/O read response message includes second data that a local server needs to obtain from the peer server.

The hardware processing engine is configured to process the second data, and directly write the processed second data into the local server. The second data is not stored in a memory of the network adapter.

In a possible implementation, the hardware processing engine is further configured to determine to perform any combination of one or more of the following processing on the second data: data decryption and data decompression.

In another possible implementation, the first I/O read response message carries decryption information. The hardware processing engine is configured to determine based on the decryption information and decrypt the second data.

According to a third aspect, a data processing method of a network adapter is provided. A network adapter includes a processor and a hardware processing engine. The method includes:

The processor of the network adapter obtains a first input/output I/O command, where the first I/O command indicates to write first data stored in a local server into at least one peer server.

The processor of the network adapter sends first indication information to the hardware processing engine, where the first indication information indicates the hardware processing engine to obtain the first data from the local server, and the first indication information includes address information and length information.

When the first data is obtained from the local server based on the address information and the length information, the hardware processing engine of the network adapter directly processes the first data, and sends processed first data to the at least one peer server, where the first data is not stored in a memory of the network adapter.

In a possible implementation, the first indication information further indicates the hardware processing engine to perform any combination of one or more of the following processing on the first data: data fingerprint computing, data deduplication processing, data encryption, data compression, and data redundancy error correction encoding computing. When the first data is obtained from the local server based on the address information and the length information, the hardware processing engine of the network adapter directly processes the first data based on the first indication information.

In another possible implementation, the data redundancy error correction encoding computing may be, for example, erasure code (EC) computing.

In another possible implementation, the first indication information indicates the hardware processing engine to perform fingerprint computing on the first data. The hardware processing engine of the network adapter performs fingerprint computing on the first data to obtain fingerprint information corresponding to the first data. The hardware processing engine of the network adapter sends the fingerprint information corresponding to the first data to the processor. The processor of the network adapter performs deduplication processing based on the fingerprint information corresponding to the first data.

In another possible implementation, the method further includes: After the first data is processed, the hardware processing engine of the network adapter places the processed first data into a sending queue of the hardware processing engine, and sends the processed first data to the at least one peer server; and if the first data includes duplicate data, the processor of the network adapter sends, by using the hardware processing engine, second indication information to a peer server that stores the duplicate data, where the second indication information is used to delete the duplicate data.

In another possible implementation, the method further includes: After the first data is processed, the hardware processing engine of the network adapter sends a notification message to the processor, where the notification message is used to notify the processor to send the first data; and when the processed first data is placed into a sending queue of the hardware processing engine, if it is determined that the first data includes duplicate data, the processor of the network adapter skips delivering the duplicate data to the sending queue; or after the processed first data is placed into a sending queue of the hardware processing engine, if it is determined that the first data includes duplicate data, the processor of the network adapter sends, by using the hardware processing engine, second indication information to a peer server that stores the duplicate data, where the second indication information is used to delete the duplicate data.

In another possible implementation, the first indication information includes a plurality of groups of address information and length information. The method further includes: The processor of the network adapter splits the first data based on address information and length information that are of the first data and that are stored in the local server, to obtain the plurality of groups of address information and length information.

In another possible implementation, the processed first data includes the processed first data and redundancy error correction data corresponding to the processed first data. The redundancy error correction data is stored in the memory of the network adapter. The processed first data is not stored in the memory of the network adapter. The method further includes: The hardware processing engine of the network adapter obtains the redundancy error correction data from the memory of the network adapter, and obtains the processed first data again from the local server; and the hardware processing engine of the network adapter sends the processed first data and the redundancy error correction data to the at least one peer server.

In another possible implementation, the processed first data includes the processed first data and redundancy error correction data corresponding to the processed first data. The redundancy error correction data is stored in the memory of the network adapter. The processed first data is stored in a local area of the hardware processing engine. The method further includes: The hardware processing engine of the network adapter obtains the redundancy error correction data from the memory of the network adapter, and obtains the processed first data from the local area; and the hardware processing engine of the network adapter sends the processed first data and the redundancy error correction data to the at least one peer server.

In another possible implementation, the method further includes: The processor of the network adapter receives a first I/O read response message from a peer server, where the first I/O read response message includes second data that the local server needs to obtain from the peer server; and the hardware processing engine of the network adapter processes the second data, and directly writes processed second data into the local server, where the second data is not stored in the memory of the network adapter.

In another possible implementation, the method further includes: The hardware processing engine of the network adapter determines to perform any combination of one or more of the following processing on the second data: data fingerprint computing, data deduplication processing, data decryption, and data decompression.

In another possible implementation, the method further includes: The hardware processing engine of the network adapter determines based on the decryption information and decrypts the second data.

Beneficial effects of any one of the third aspect or the possible implementations of the third aspect correspond to beneficial effects of any one of the first aspect or the possible implementations of the first aspect. Details are not described again.

According to a fourth aspect, a data processing method of a network adapter is provided. A network adapter includes a processor and a hardware processing engine. The method includes: The processor of the network adapter receives a first I/O read response message from a peer server, where the first I/O read response message includes second data that the local server needs to obtain from the peer server; and the hardware processing engine of the network adapter processes the second data, and directly writes processed second data into the local server, where the second data is not stored in a memory of the network adapter.

In a possible implementation, the method further includes: The hardware processing engine of the network adapter determines to perform any combination of one or more of the following processing on the second data: data decryption and data decompression.

In another possible implementation, the first I/O read response message carries decryption information. The method further includes: The hardware processing engine of the network adapter determines based on the decryption information and decrypts the second data.

According to a fifth aspect, a network adapter is provided, including a processor and a memory. The processor runs instructions in the memory, so that a computing device performs the method steps in any one of the first aspect or the possible implementations of the first aspect.

According to a sixth aspect, a network adapter is provided, including a processor and a memory. The processor runs instructions in the memory, so that a computing device performs the method steps in any one of the second aspect or the possible implementations of the second aspect.

According to a seventh aspect, a server is provided, including the network adapter according to any one of the first aspect or the possible implementations of the first aspect or the network adapter according to any one of the fifth aspect or the possible implementations of the fifth aspect.

According to an eighth aspect, a server is provided, including the network adapter according to any one of the second aspect or the possible implementations of the second aspect or the network adapter according to any one of the sixth aspect or the possible implementations of the sixth aspect.

According to a ninth aspect, a computer-readable storage medium is provided, including instructions. The instructions are used to perform the method steps in any one of the third aspect or the possible implementations of the third aspect.

Optionally, in an implementation, the storage medium may be a nonvolatile storage medium.

According to a tenth aspect, a computer-readable storage medium is provided, including instructions. The instructions are used to perform the method steps in any one of the fourth aspect or the possible implementations of the fourth aspect.

Optionally, in an implementation, the storage medium may be a nonvolatile storage medium.

According to an eleventh aspect, a chip is provided. The chip obtains instructions and executes the instructions to implement the method in any one of the third aspect and the implementations of the third aspect.

Optionally, in an implementation, the chip includes a processor and a data interface. The processor reads, through the data interface, instructions stored in a memory, to perform the method in any one of the third aspect and the implementations of the third aspect.

Optionally, in an implementation, the chip may further include a memory. The memory stores instructions, a processor is configured to execute the instructions stored in the memory. When the instructions are executed, the processor is configured to perform the method in any one of the third aspect and the implementations of the third aspect.

According to a twelfth aspect, a chip is provided. The chip obtains instructions and executes the instructions to implement the method in any one of the fourth aspect or the possible implementations of the fourth aspect.

Optionally, in an implementation, the chip includes a processor and a data interface. The processor reads, through the data interface, instructions stored in a memory, to implement the method in any one of the fourth aspect or the possible implementations of the fourth aspect.

Optionally, in an implementation, the chip may further include a memory. The memory stores instructions, a processor is configured to execute the instructions stored in the memory. When the instructions are executed, the processor is configured to implement the method in any one of the fourth aspect or the possible implementations of the fourth aspect.

DESCRIPTION OF EMBODIMENTS

Figure 1:
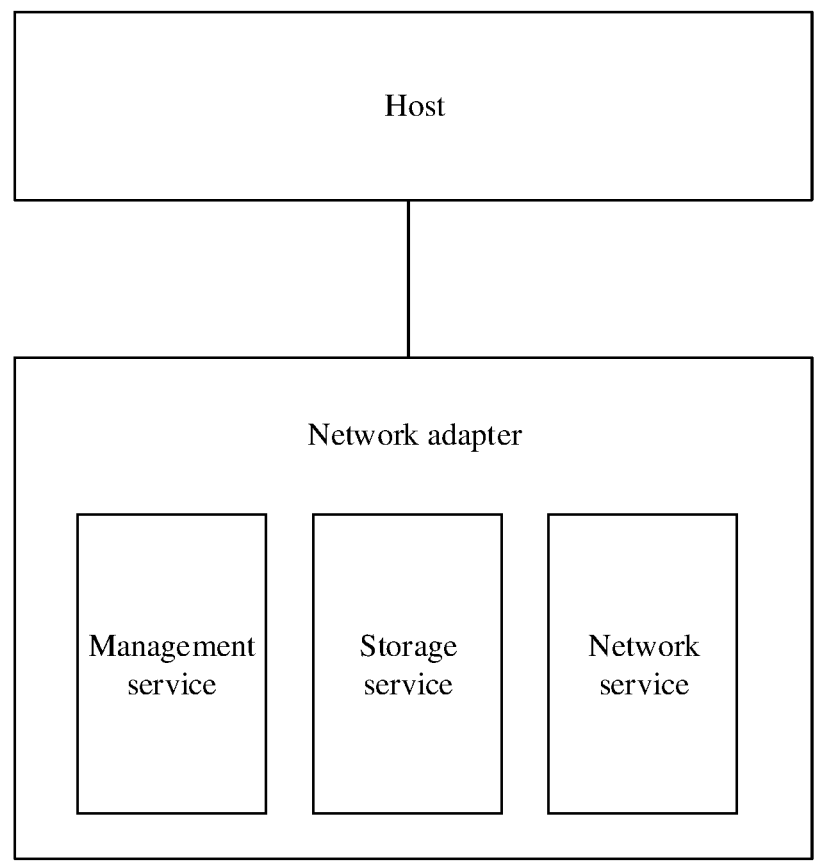
FIG. 1 is a schematic diagram of an architecture according to an embodiment of this application.

The following describes technical solutions of this application with reference to accompanying drawings.

All aspects, embodiments, or features are presented in this application based on a system that includes a plurality of devices, components, and modules. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, terms such as "for example" and "such as" are used to represent giving an example, an illustration, or description. Any embodiment or design scheme described as an "example" in this application should not be explained as being more preferred or having more advantages than another embodiment or design scheme. Exactly, the word "example" is used to present a concept in a specific manner.

In embodiments of this application, "corresponding (or relevant)" and "corresponding" may be interchangeably used sometimes. It should be noted that meanings expressed by the terms are consistent when differences are not emphasized.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

Reference to "an embodiment", "some embodiments", or the like described in this specification indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

In this application, "at least one" means one or more, and "a plurality of" means two or more. The term "and/or" describes an association relationship for describing associated objects and represents that three relationships may exist. For example, A and/or B may indicate a case in which only A exists, both A and B exist, and only B exists, where A and B may be singular or plural. The character "/" generally represents an "or" relationship between associated objects. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

With the emergence of cloud computing, to reduce usage of a host processor (for example, a central processing unit (CPU)), provide more host CPUs for external sales, or enhance user experience, and prevent a CPU of a user from being affected by more background services of a host, as shown in FIG. 1, an existing cloud computing vendor gradually offloads a management service, a storage service, a network service, and the like that originally run on the host to a network adapter, and a CPU on the network adapter processes the foregoing services. In this way, the host CPU can almost be fully provided for the user for other uses.

Figure 2:
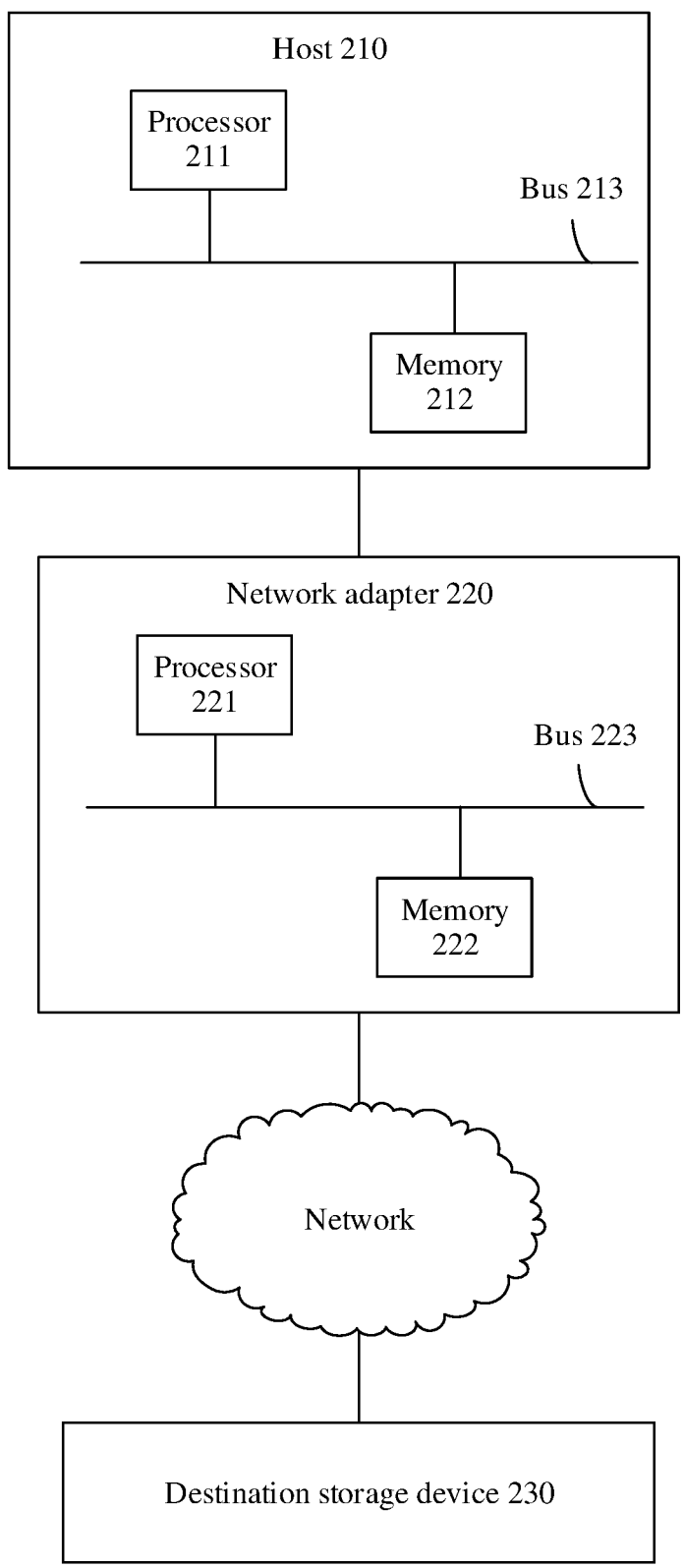
FIG. 2 is a schematic diagram of an application scenario according to an embodiment of this application.

The following describes the storage service in detail by using an application scenario shown in FIG. 2 as an example.

As shown in FIG. 2, the scenario may include a host 210, a network adapter 220, and a destination storage device 230. The following separately describes each device in detail.

1. Host 210

The host 210 may include at least one processor 211 and a memory 212.

Optionally, the host 210 further includes a system bus 213. The at least one processor 211 and the memory 212 are separately connected to the system bus 213.

The processor 211 can access the memory 212 through the system bus 213. For example, the processor 211 can perform data reading/writing or code execution in the memory 212 through the system bus. The system bus 213 may be, for example, a quick path interconnect (QPI) or an ultra path interconnect (UPI). The system bus 213 is classified into an address bus, a data bus, a control bus, and the like. For ease of representation, only one thick line is used to represent the bus in FIG. 2, but this does not mean that there is only one bus or only one type of bus.

In a possible implementation, the processor 211 mainly functions to interpret instructions (or code) of a computer program and process data in computer software. The instructions of the computer program and the data in the computer software can be stored in the memory 212.

The processor 211 is a computing unit and a control unit of the host 210. The processor 211 may include a plurality of processor cores. All computing, command receiving, command storage, and data processing in the processor 211 are performed by the processor cores. Each of the processor cores runs program instructions independently and uses a parallel computing capability to speed up program running. The processor core (core) has a fixed logical structure, for example, includes logical units such as a level 1 cache, a level 2 cache, an execution unit, an instruction level unit, and a bus interface.

Optionally, the processor 211 may be an integrated circuit chip, and has a signal processing capability. By way of example, and not limitation, the processor 110 is a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor is a microprocessor, or the like. For example, the processor 110 is a central processing unit (CPU).

The memory 212 is a main memory of the host 210 (which may also be referred to as a memory of the host 210). The memory 212 is usually configured to store various software programs that are running in an operating system, an input/output (I/O) command delivered by an upper-layer application, information exchanged with an external memory, and the like. To improve an access speed of the processor 211, the memory 212 needs to have a high access speed. In some computer system architectures, a dynamic random access memory (DRAM) is used as the memory 212. The processor 211 can access the memory 212 at a high speed by using a memory controller (not shown in FIG. 1), to perform a read operation and a write operation on any storage unit in the memory 212.

It should be further understood that the memory 212 in this embodiment of this application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through an example rather than a limitative description, random access memories (RAM) in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

2. Network Adapter 220

The network adapter 220 is configured to implement communication between the host 210 and another server (for example, the destination storage device 230 shown in FIG. 1) in a communication network. The network adapter 220 may be built in the host 210, or may be used as an external device of the host 210, and is connected to the host 210 through an interface. The interface may be, for example, a peripheral component interface express (PCIE) interface.

For ease of description, in FIG. 2, the network adapter 220 is used as an external device of the host 210 for description.

The network adapter 220 may also include a memory 222 and a processor 221. Optionally, the network adapter 220 may further include a bus 223. An internal structure of the network adapter 220 may be similar to that of the host 210. For details, refer to the foregoing descriptions of the parts in the host 210. Details are not described herein again.

3. Destination Storage Device 230

The destination storage device 230 may also include a memory, a processor, and a network adapter. Optionally, the destination storage device 230 may further include a bus. An internal structure of the destination storage device 230 may be similar to that of the host 210. For details, refer to the foregoing descriptions of the parts in the host 210. Details are not described herein again.

In a data processing and communication scenario, the host 210 is used as a local end, and the destination storage device 230 is used as a communication peer end. A virtual machine (virtual machine, VM) on the host 210 delivers an input/output (I/O) command, and the processor 211 of the host 210 may send the I/O command to the memory 212 through the bus 213. The network adapter 220 obtains the I/O command from the memory 212, and processes the I/O command.

For example, the I/O command is a read command and a write command. The read command is delivered by an application program (for example, the VM) running on the host and indicates to read data from a remote device (for example, a destination storage device). The write command is delivered by an application program (for example, the VM) running on the host and indicates to write data into the remote device. The processor of the host may receive the I/O command, and store the I/O command in the memory, so that the I/O command waits to be processed by the network adapter 220 and then is sent to the destination storage device 230 serving as the communication peer end.

The I/O write command is used as an example. Before sending I/O write data stored in the memory 212 of the host 210 to the destination storage device 230, the network adapter 220 further needs to perform storage service processing on the I/O write data, and then send processed data to the destination storage device 230. In this embodiment of this application, storage service processing in an I/O write process is not specifically limited, and may include but is not limited to: data deduplication processing, data encryption processing, data compression processing, data redundancy error correction encoding computing (for example, EC computing), and the like.

The I/O read command is used as an example. After obtaining to-be-read data from the destination storage device 230, the network adapter 220 may perform storage service processing on the I/O read data, and then store processed data in the memory 212. In this embodiment of this application, storage service processing in an I/O read process is not specifically limited, and may include but is not limited to data decryption processing, data decompression processing, and the like.

In a related technical solution, for example, the I/O command is an I/O write command. The network adapter 220 needs to migrate I/O write data from the memory 212 of the host 210 to the memory 222 of the network adapter 220. The processor 221 of the network adapter 220 performs storage service processing on the I/O write data in the memory 222. Then, processed data is stored in the memory 222 of the network adapter 220, so that the processor 221 of the network adapter 220 performs next processing on the data in the memory 222.

For example, the I/O command is an I/O read command. After obtaining to-be-read data from the destination storage device 230, the network adapter 220 needs to first store the data in the memory 222 of the network adapter 220. The processor 221 of the network adapter 220 performs storage service processing on the I/O write data in the memory 222. Then, processed data is stored in the memory 222 of the network adapter 220, so that the processor 221 of the network adapter 220 writes the data in the memory 222 into the memory 212 of the host 210.

In the foregoing related technical solution, when performing storage service processing on the data, the network adapter 220 needs to repeatedly obtain data from the memory 222 of the network adapter 220 through the bus 223. This strains the bus 223 of the network adapter 220. In addition, the network adapter 220 needs a large quantity of memories 222 to store the processed data. Storage and management of the data greatly increase program complexity and resource consumption of the memory 222.

In view of this, this application provides a network adapter. When obtaining data from a memory of a host, the network adapter directly performs storage service processing on the data, and directly sends the processed data to a destination storage device at a peer end. The data obtained from the memory of the host is not stored in the memory of the network adapter. The processed data is not stored in the memory of the network adapter either, but is directly sent to the destination storage device. In this way, when performing storage service processing on the data, the network adapter does not need to repeatedly obtain data from the memory of the network adapter through a bus. This reduces strains on the bus of the network adapter. In addition, the network adapter does not need a large quantity of memories to store the processed data. This can reduce program complexity and resource consumption of the memory.

Figure 3:
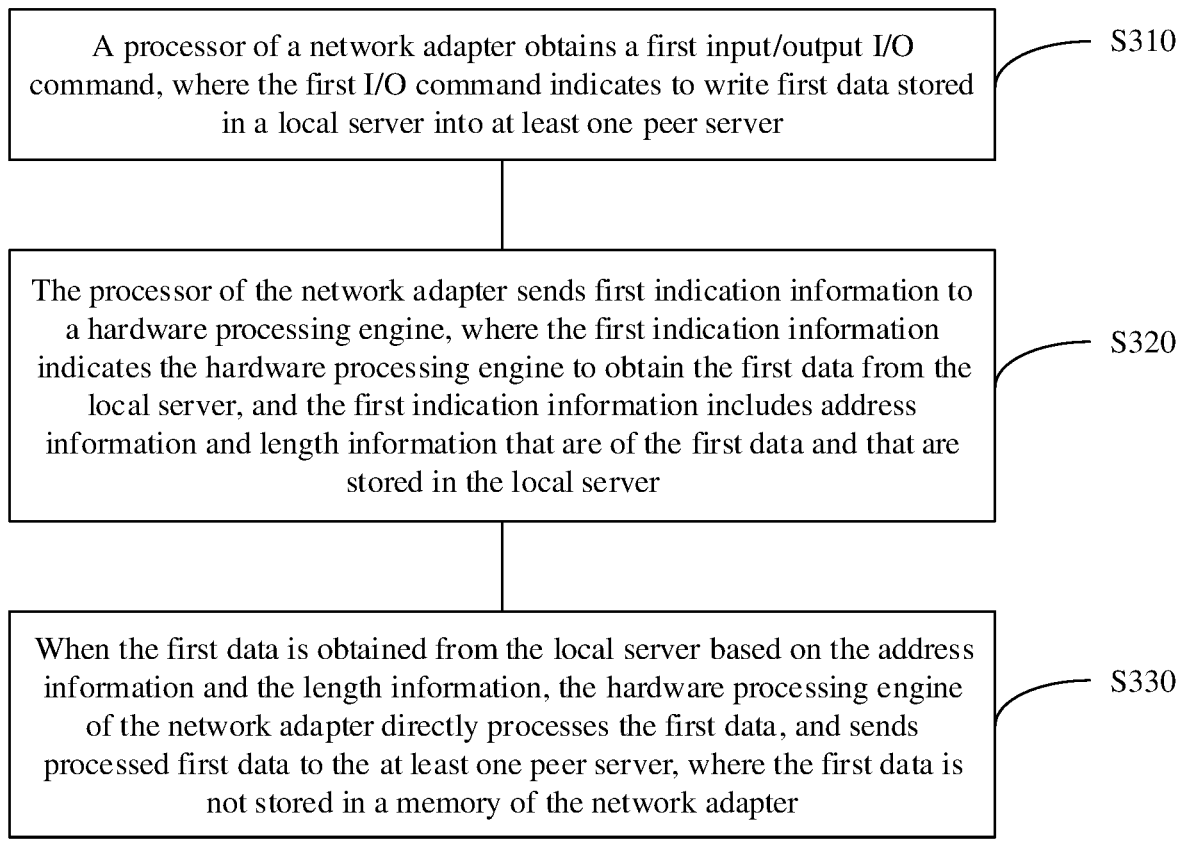
FIG. 3 is a schematic flowchart of a data processing method of a network adapter according to an embodiment of this application.

The following describes in detail a data processing method of a network adapter according to an embodiment of this application with reference to FIG. 3.

FIG. 3 is a schematic flowchart of a data processing method of a network adapter according to an embodiment of this application. As shown in FIG. 3, the method may include steps 310 to 330. The following separately describes steps 310 to 330 in detail.

Step 310: A processor of a network adapter obtains a first input/output I/O command, where the first I/O command indicates to write first data stored in a local server into at least one peer server.

The first I/O command may further include address information and length information that are of data and that are stored in the local server.

In this embodiment of this application, the first I/O command may indicate to write the data stored in the local server into the at least one peer server. In an example, the data may be stored in a memory of the local server.

In an example, the local server may be the host 210 in FIG. 2. The peer server may be a storage device, or a computing device having a computing capability. In an example, the peer server is the destination storage device 230 in FIG. 2.

The network adapter can be used as an external device of the local server, and is connected to the local server through an interface. The interface may be a peripheral component interface express (PCIE) interface. For a specific connection relationship, refer to the descriptions in FIG. 2. Details are not described herein again.

Step 320: The processor of the network adapter sends first indication information to a hardware processing engine of the network adapter, where the first indication information indicates the hardware processing engine to obtain the first data from the local server, and the first indication information includes address information and length information that are of the first data and that are stored in the local server.

After processing the first I/O command, the processor of the network adapter may send the first indication information to the hardware processing engine of the network adapter. In an example, the processor of the network adapter may split the data based on the address information and the length information that are of the data and that are stored in the local server in the first I/O command, to obtain a plurality of groups of address information and length information.

It should be understood that the address information and the length information of the data may be used to describe a data block stored in the memory in the local server.

Step 330: When the first data is obtained from the local server based on the address information and the length information, the hardware processing engine of the network adapter directly processes the first data, and sends processed first data to the at least one peer server, where the first data is not stored in a memory of the network adapter.

After receiving the first indication information sent by the processor of the network adapter, the hardware processing engine of the network adapter may obtain the first data from the local server based on the address information and the length information that are of the first data and that are carried in the first indication information. In addition, when the first data is obtained, the hardware processing engine of the network adapter directly performs storage service processing on the first data, and sends processed first data to the at least one peer server.

In this embodiment of this application, the memory of the network adapter may not need to store the first data. In this way, data does not need to be read from the memory of the local server to the memory of the network adapter. This can reduce strains on the bus of the network adapter, and also reduce overheads of the processor of the network adapter. In addition, the network adapter does not need a large quantity of memories to store to-be-written data. This reduces program complexity and resource consumption of the memory.

In the foregoing technical solution, when obtaining data from a memory of a host, the network adapter directly performs storage service processing on the data, and directly sends the processed data to a destination storage device at a peer end. The data obtained from the memory of the host is not stored in the memory of the network adapter. The processed data is not stored in the memory of the network adapter either, but is directly sent to the destination storage device. In this way, when performing storage service processing on the data, the network adapter does not need to repeatedly obtain data from the memory of the network adapter through the bus of the network adapter. This reduces strains on the bus of the network adapter. In addition, the network adapter does not need a large quantity of memories to store the processed data. This can reduce program complexity and resource consumption of the memory of the network adapter.

Figure 4:
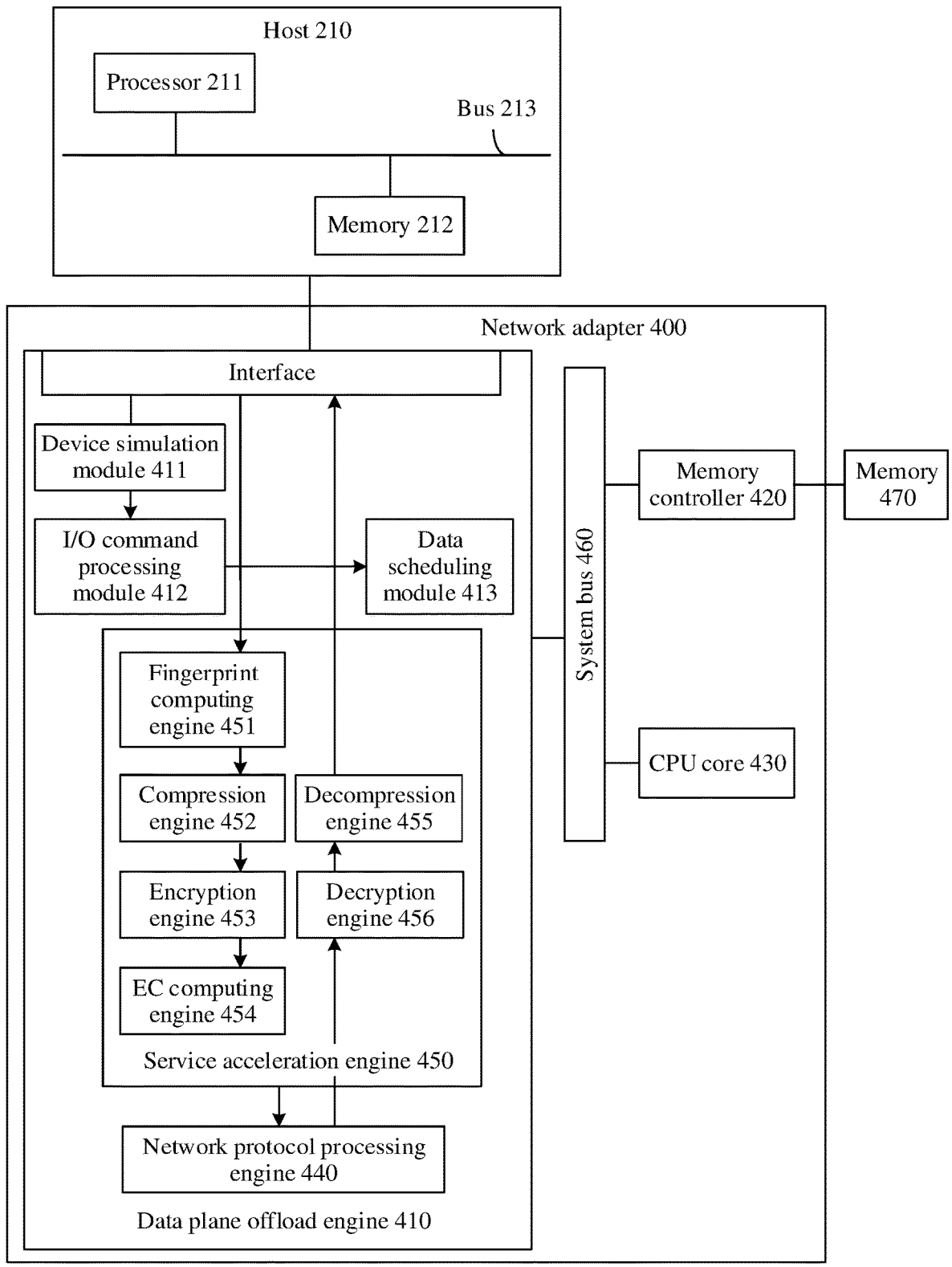
FIG. 4 is a schematic diagram of a structure of a network adapter 400 according to an embodiment of this application.

The following describes in detail a possible structure of a network adapter according to an embodiment of this application with reference to FIG. 4.

FIG. 4 is a schematic diagram of a structure of a network adapter 400 according to an embodiment of this application. As shown in FIG. 4, the network adapter 400 is connected to the host 210 through a PCIE interface.

The network adapter 400 may include a data plane offload engine 410, a memory controller 420, a CPU core 430, a memory 470, and a system bus 460.

1. Data Plane Offload Engine 410

The data plane offload engine 410 may also refer to the foregoing hardware processing engine. In an example, the data plane offload engine 410 may be formed by an engine of a dedicated processing architecture that specifically supports data plane processing, such as hardware logic, a field programmable gate array (FPGA), or a network processor (NP). The data plane offload engine 410 can quickly forward packets, but is not suitable for complex protocol processing.

It should be understood that the data plane offload engine 410 is suitable for network forwarding processing. Therefore, generally a data plane for network forwarding may be undertaken by the data plane offload engine 410. However, a data plane of a storage service cannot be directly completed by the data plane offload engine 410 due to service complexity, and generally needs the CPU core 430 to complete.

The data plane offload engine 410 may be connected to the host 210 through the PCIE interface, and is configured to obtain data stored in the memory 212 of the host 210. The data plane offload engine 410 may be further connected to the CPU core 430 and the memory controller 420 through the system bus 460, to implement high-speed communication between modules inside the data plane offload engine 410, the CPU core 430, and the memory controller 420.

The data plane offload engine 410 may internally include: a device simulation module 411, an I/O command processing module 412, a data scheduling module 413, a network protocol processing engine 440, and a service acceleration engine 450.

The following separately describes in detail functions of the modules included in the data plane offload engine 410.

The device simulation module 411 is mainly configured to implement device simulation, for example, simulation of a storage device or a network device, so that the network adapter 400 presents a required device to the host or a virtual machine VM running on the host. In an example, the device simulation module 411 is configured to implement presentation of a non-volatile memory express (NVMe) storage device, a small computer system interface (SCSI) device, a virtual small computer system interface (virtio-SCSI) device, a virtio-BLK device, and another type of virtio device.

It should be understood that device simulation may also be jointly completed by hardware logic and a CPU core. Generally, data interaction is completed by a data plane offload engine, and a configuration-related operation is cooperatively completed by the CPU core and the data plane offload engine.

The I/O command processing module 412 is configured to perform simple analysis and processing on an I/O command. In an example, the I/O command processing module 412 may be configured to determine whether the I/O command is a read command or a write command. In another example, an I/O read/write command usually needs to be scheduled, to ensure I/O quality of service (QoS) of a device.

The data scheduling module 413 is configured to schedule a plurality of I/O commands. In an example, the scheduling may include QoS processing on data. For example, to avoid improper load of a VM or a volume, bandwidth and a packet rate of each device need to be limited. For I/O data storage, the I/O commands need to be scheduled by managing input/output operation per second (IOPS) and bandwidth of the volume and TOPS and bandwidth of the entire VM.

The service acceleration engine 450 is mainly configured to perform storage service processing on data. A process of storage service processing is not specifically limited in this embodiment of this application. The process may include any combination of one or more of the following: fingerprint computing, compression, decompression, encryption, decryption, EC computing, and the like.

For example, the service acceleration engine 450 may include a fingerprint computing engine 451, a compression engine 452, an encryption engine 453, an EC computing engine 454, a decryption engine 455, and a decompression engine 456.

The service acceleration engine 450 may perform high-speed communication with the CPU core 430 through the bus 460. In the vertical direction, when data is obtained from the host 210, the service acceleration engine 450 can further process the data in a pipeline manner by sequentially using any combination of one or more of the following engines: the fingerprint computing engine 451, the compression engine 452, the encryption engine 453, and the EC computing engine 454.

In this embodiment of this application, each engine in the service acceleration engine 450 may be configured to whether to perform transparent transmission, stop, or enable. Transparent transmission indicates that data directly skips being processed by a current engine and directly enters a next level. Stop indicates that data stops entering a next level and is directly forwarded to the CPU core 430 for processing. Enable indicates that data enters a next-level engine after proper processing.

Optionally, as a candidate, a selection module (not shown in FIG. 4) may be further added in this embodiment of this application. The selection module determines which offload engine or network adapter CPU is used for processing data at a next level. In an example, a selection sequence of the selection module may be determined through configuration.

For ease of description, the following first describes in detail functions of the engines included in the service acceleration engine 450.

The fingerprint computing engine 451 is configured to perform fingerprint computing on data obtained from the memory 212 of the host 210. In an example, fingerprint computing may be performed according to a hash algorithm. For example, fingerprint computing may be performed on the data according to a secure hash algorithm 256 (secure hash algorithm 256, SHA 256). A fingerprint computing result may be used for data deduplication processing. For specific data deduplication processing, refer to the following descriptions. Details are not described herein.

The compression engine 452 is configured to perform compression processing on data to obtain compressed data. Because an actual data block of the compressed data is smaller, a compression status may be recorded in a message header. In this way, assembling may be performed based on the actually compressed data when a message is sent. This reduces network bandwidth consumption.

Optionally, in a simplified solution, because data is stored in a form of blocks, the compressed data may be recorded in a form of storage data blocks, and an idle part is padded with 0.

The decompression engine 456 is configured to perform decompression processing on data to obtain before-compression data.

The encryption engine 453 is configured to perform encryption processing on data to obtain encrypted data.

The decryption engine 455 is configured to decrypt the encrypted data to obtain before-encryption data.

The EC computing engine 454 is configured to perform redundancy protection on data. In an example, in the EC manner, EC computing is performed on M data blocks to generate N redundant blocks. The N redundant blocks are usually stored in different storage devices. If N or less data blocks are damaged in M data blocks, data can be accurately restored. This is generally referred to as M+N EC computing. A larger value of M indicates higher data storage efficiency, and a larger value of N indicates higher reliability. In this way, original data can be restored as long as a quantity of faulty nodes does not exceed N. It should be understood that when M and N are 1, it is a typical 1+1 backup solution.

The network protocol processing engine 440 is mainly configured to complete network protocol processing, to ensure that data is reliably transmitted to a destination node. There may be a plurality of network protocols. This is not specifically limited in this application. For example, the network protocol may be a remote direct memory access (RDMA) protocol. For another example, the network protocol may alternatively be a transmission control protocol (TCP). For another example, the network protocol may alternatively be a user-defined reliable transmission protocol.

2. Memory Controller 420

The memory controller 420 is configured to control data exchange between the memory 470 and the CPU core 430. For example, the memory controller 420 receives a memory access request from the CPU core 430, and controls access to the memory 470 based on the memory access request.

In an implementation example, each memory controller 420 performs addressing for the memory 470 through the system bus 460. In addition, an arbiter (not shown in the figure) is configured in the system bus. The arbiter is responsible for processing and coordinating contention access of a plurality of CPU cores 430.

3. CPU Core 430

The CPU core 430 is a most important component of a CPU, and may also be referred to as a CPU processing unit.

The CPU core 430 is made of monocrystalline silicon by using a specific production process. All computing, command receiving, command storage, and data processing of the CPU are executed by the CPU core 430. Each CPU core 430 runs program instructions independently and uses a parallel computing capability to speed up program running. Each CPU core 430 has a fixed logical structure. For example, the CPU core 430 includes logical units such as a level 1 cache, a level 2 cache, an execution unit, an instruction level unit, and a bus interface.

The CPU core 430 is generally configured to perform complex service processing, and usually runs an operating system (OS). In this way, complex service processing software, various management software, control plane software, and the like may run on the CPU core 430.

4. Memory 470

The memory 470 may be used as an external memory of the CPU core 430, and is configured to store the program running of the CPU core 430 and some entries of the data plane offload engine 410.

The external memory 470 is not specifically limited in this embodiment of this application. For example, the external memory 470 is a double data rate (DDR) memory.

It should be understood that, because an on-chip memory integrated inside the data plane offload engine 410 is a cache, and the on-chip memory has a high speed and high costs, only a small quantity of on-chip memories can be integrated. A large quantity of entries need to be stored in the external memory 470. For example, the external memory 470 stores a large forwarding flow table required for network forwarding, receiving and sending queues of a network connection, a context entry of a network connection, a context entry of an I/O, and the like.

It should be further understood that, sending data to a CPU actually means that data is sent to the external memory 470 of the CPU core 430. Sending data to a CPU and sending data to a CPU memory in the following descriptions in this specification mean that data is sent to the external memory 470 of the CPU core 430.

5. System Bus 460

The system bus 460 may be connected to the data plane offload engine 410, the CPU core 430, and the memory controller 420, so that the data plane offload engine 410, the CPU core 430, and the memory controller 420 may communicate with each other through the system bus 460.

Figure 5:
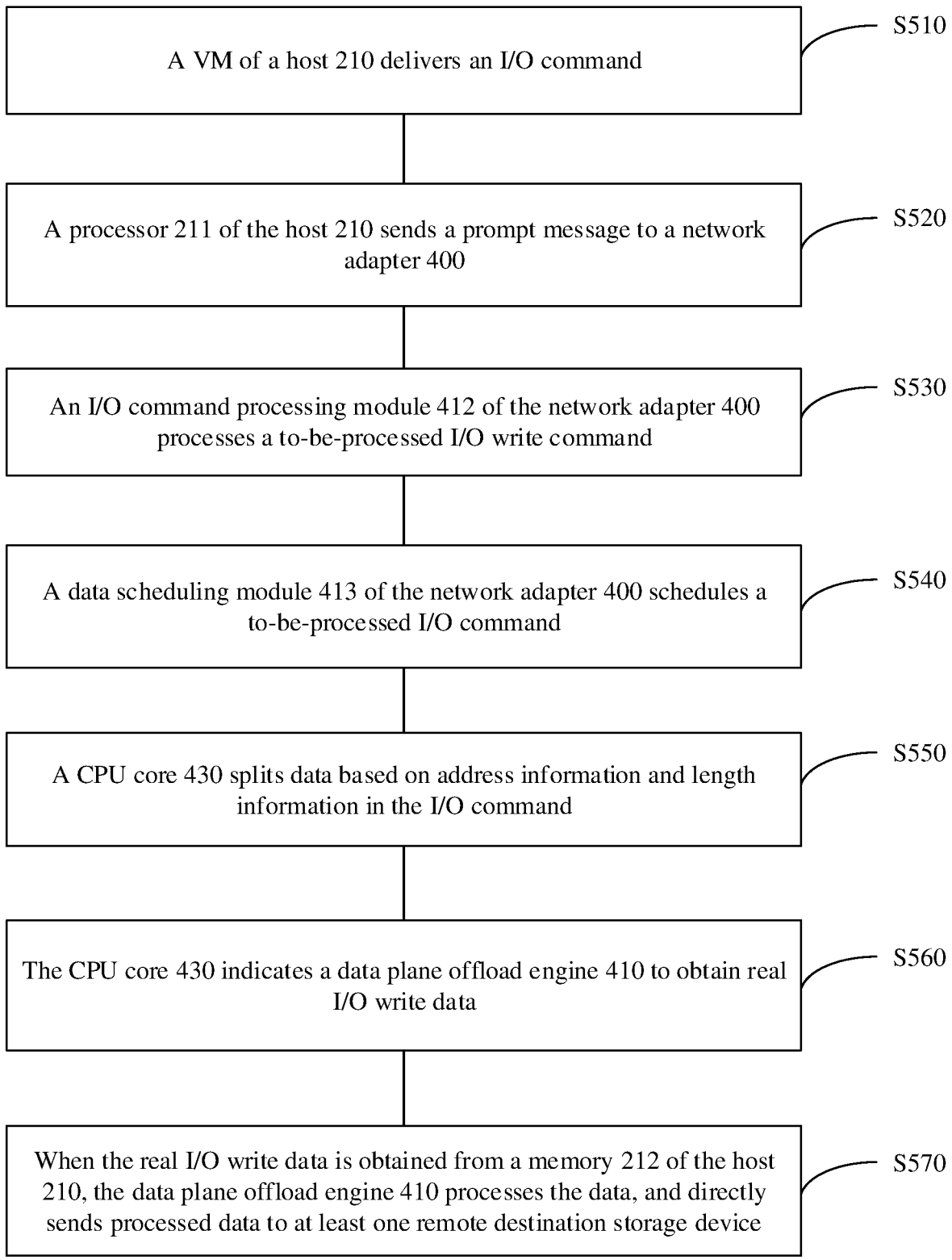
FIG. 5 is a schematic flowchart of a method for processing an I/O write command by a network adapter according to an embodiment of this application.

The following uses the hardware architecture shown in FIG. 4 as an example to describe in detail, with reference to an example in FIG. 5, an implementation in which a network adapter processes an I/O write command. It should be understood that the example in FIG. 5 is merely intended to help a person skilled in the art understand embodiments of this application, but is not intended to limit embodiments of this application to a specific value or a specific scenario in FIG.

FIG. 5 is a schematic flowchart of a method for processing an I/O write command by a network adapter according to an embodiment of this application. As shown in FIG. 5, the method may include steps 510 to 570. The following separately describes steps 510 to 570 in detail.

Step 510: AVM of the host 210 delivers an I/O write command.

A VM of the host may initiate an I/O write command of a storage service based on a storage I/O device interface (for example, NVMe, SCSI, Virtio-BLK, or Virtio-SCSI).

It should be understood that a virtual device may be identified by using an identifier (ID). A storage I/O device is usually mapped to a function on the PCIE interface. When single-root I/O virtualization (SR-MY) is enabled, the foregoing storage I/O device may be a physical function (PF) or a virtual function (VF). Because there are usually more VFs, those allocated to the VM are mainly VFs in a VM application scenario. For ease of description, the following describes the VF. However, unless only the PF can be used is specified, all VF descriptions are also applicable to the PF. In other words, in an example, a VM running on the host 210 may be identified by using the VF.

Step 520: The processor 211 of the host 210 sends a prompt message to the network adapter 400.

After sending the to-be-processed I/O write command to the memory 212, the processor 211 may send the prompt message to the network adapter 400. The prompt message is used to notify the data plane offload engine 410 that there is a to-be-processed I/O command.

In an example, the prompt message may be a door bell (DB).

Step 530: The I/O command processing module 412 of the network adapter 400 processes the to-be-processed I/O write command.

For an I/O command such as an I/O read command or an I/O write command, QoS control usually needs to be performed. For example, for logical unit number (LUN) information (namespace in NVMe) in the I/O command, a LUN ID of a VM and VF information of an ingress may be converted into a global LUN ID. The global LUN ID may be address information of a destination storage device.

For ease of description, the LUN ID in the following descriptions may be understood as the global LUN ID.

It should be understood that VF information (for example, a VF ID) is not in the I/O command, just like a port attribute of a packet entering the network adapter, the information is not in the packet.

Step 540: The data scheduling module 413 of the network adapter 400 schedules the to-be-processed I/O command.

It should be understood that step 540 is optional. To be specific, if the to-be-processed I/O command includes a plurality of I/O commands, to avoid improper load of a VM or a volume, bandwidth and packet rate of each device need to be limited. Therefore, the data scheduling module 413 needs to schedule the plurality of I/O commands, and an I/O command that meets a condition is selected from the plurality of I/O commands. The data scheduling module 413 may store, in the memory 470 of the network adapter 400, the I/O command that meets the condition in an I/O message receiving queue.

The data scheduling module 413 in the data plane offload engine 410 schedules the plurality of I/O commands, and stores the scheduled I/O commands in the I/O message receiving queue.

Step 550: The CPU core 430 splits the data based on address information and length information in the I/O command.

After the I/O command is stored in the external memory 470 of the network adapter 400, software on the CPU core 430 analyzes the I/O command. In an example, the I/O command may generally include information such as a LUN, a logical block address (LBA), a data size, and a scatter gather (SG) list pointing to a data block.

The LUN represents an ID of a to-be-accessed storage unit, for example, an ID of the destination storage device 230 shown in FIG. 2. The LBA indicates a block in which data on the to-be-accessed storage unit is located, namely, a start address of a logical address of the to-be-accessed data stored in the LUN. The size indicates a size of data after the address is read. The CPU core 430 may address the destination storage device based on the LUN, the LBA, and the size.

The SG list is a list consisting of a plurality of addresses and lengths. An address+length form a memory block, and a plurality of address blocks form a total memory size required for storing I/O data in the host. In other words, the SG list describes a scattered data block by using a sequence of a start address+length, and a plurality of data blocks are combined into a logically consecutive data block.

It should be understood that an address+length in the SG list may correspond to the address information and the length information of the foregoing data.

For I/O write, the SG list indicates locations in a memory of the host from which data is read and written into the destination storage device.

It should be noted that the SG has only address and length information. During virtualization application, VF ID information further needs to be added, so that the SG can be accurately mapped to a memory address of a corresponding VM.

The following describes in detail an implementation process in which the CPU core 430 splits the data based on the address of the to-be-processed data in the memory of the host and the data length.

It should be understood that, for a distributed storage system commonly used in cloud computing, data is stored in hundreds or thousands of destination storage devices in a distributed manner. In this way, high-speed concurrent access to data can be implemented, extremely high performance can be obtained, and better security and scalability can be implemented. This process is a process of splitting data. To be specific, data is split into data blocks of a fixed size, for example, split into data blocks of sizes such as 4 K, 8 K, 16 K, and 32 K, and different data blocks are sent to different destination storage devices.

For I/O write, to-be-written data needs to be split, and different data blocks obtained through splitting are sent to different destination storage devices.

Optionally, in some embodiments, to improve efficiency of sending data to a plurality of destination storage devices, aggregation may be performed properly. A plurality of data blocks sent to a same destination storage device are combined into a larger data packet, for example, combined into a 128 KB large packet and sent at a time. In this way, it can be avoided that the CPU core 430 is overloaded because a protocol stack is frequently invoked to send data.

Figure 6:
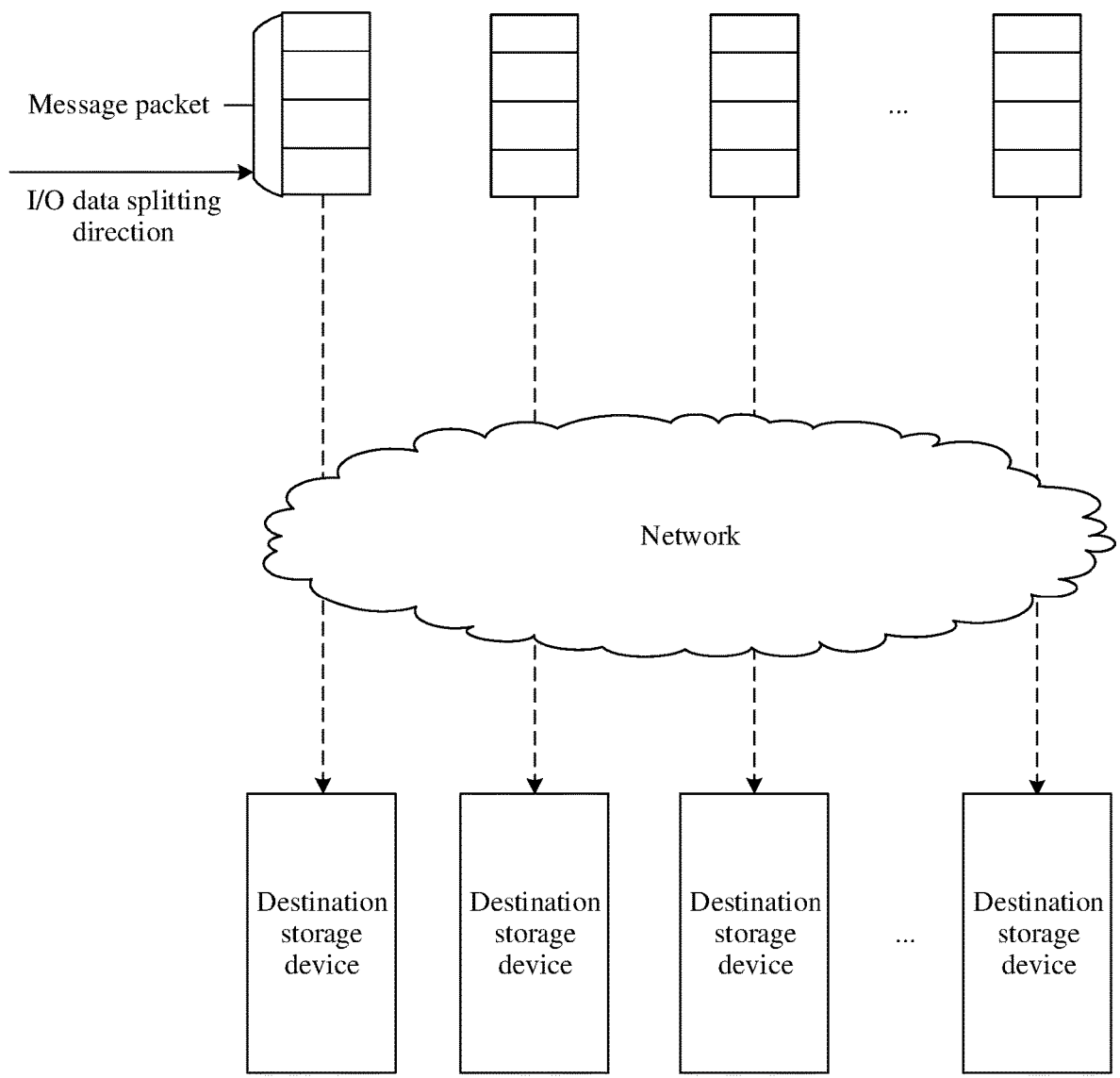
FIG. 6 is a schematic block diagram of a data splitting process according to an embodiment of this application.

FIG. 6 shows a process in which the CPU core 430 splits data. The CPU core 430 horizontally splits the I/O data, and splits one piece of I/O data into a plurality of data blocks. Data packets are generated vertically, and each data packet uniquely corresponds to one distributed remote destination storage device. Each data packet may include one data block, or may include a plurality of data blocks sent to a same destination storage device.

Because real I/O write data is stored in the memory 212 of the host 210 instead of the memory 470 of the network adapter 400, a process in which the CPU core 430 partitions the data is not based on the real I/O write data. Instead, splitting is performed based on a virtual data pointer (address information and length information that are of the data and that are in the memory 212 of the host 210) of the SG in the I/O command, and the virtual data pointer points to a data block corresponding to an address and a length of a VF in the host.

Step 560: The CPU core 430 indicates the data plane offload engine 410 to obtain the real I/O write data.

After completing processing the I/O command, the CPU core 430 may generate a message packet. The message packet includes a message header. The message header may carry information of a corresponding destination storage device. The information may generally be a sending queue of a network connection. The CPU core 430 may place M split data blocks into M message queues. Each data block does not store to-be-written real data, but stores VF+SG information corresponding to each data block obtained through splitting. The VF+SG information is the same as the address information and the length information that are of the real I/O write data and that are in the memory 212 of the host 210.

The CPU core 430 may further initiate a storage data processing instruction to the data plane offload engine 410. The instruction includes VF+SG information corresponding to each data block obtained through splitting, and indicates the data plane offload engine 410 to obtain the real I/O write data from the memory 212 of the host 210 based on the VF+SG information corresponding to each data block. After obtaining the real I/O write data, the data plane offload engine 410 may perform message encapsulation on the real I/O write data, and send an encapsulated packet to a corresponding remote destination storage device, to implement an I/O write process.

Optionally, the instruction further indicates the data plane offload engine 410 to perform storage service processing on the obtained data, so that the data plane offload engine 410 may perform corresponding storage service processing on the obtained data based on the instruction.

In this embodiment of this application, any combination of one or more of the following processing is performed on the obtained data: data fingerprint computing, data deduplication processing, data encryption, data compression, and data redundancy error correction encoding computing.

In an example, the data redundancy error correction encoding computing may be erasure code (EC) computing. Data generated through data redundancy error correction encoding computing may be referred to as redundancy error correction data.

Step 570: When the real I/O write data is obtained from the memory 212 of the host 210, the data plane offload engine 410 processes the data, and directly sends processed data to at least one remote destination storage device.

In an example, the data plane offload engine 410 separately reads, from the M message queues, the VF+SG information stored in each data block, and separately initiates DMA to the VM corresponding to the VF, to obtain the real I/O write data corresponding to each data block based on the VF+SG information.

In this embodiment of this application, the data plane offload engine 410 may further directly process the data after reading the data. For example, after the data plane offload engine 410 obtains the real I/O write data from the memory 212, the data enters the service acceleration engine 450. After performing storage service processing on the data, the service acceleration engine 450 directly sends the processed data to the network protocol processing engine 440, and the network protocol processing engine 440 directly sends the processed data to the at least one remote destination storage device.

Figure 7:
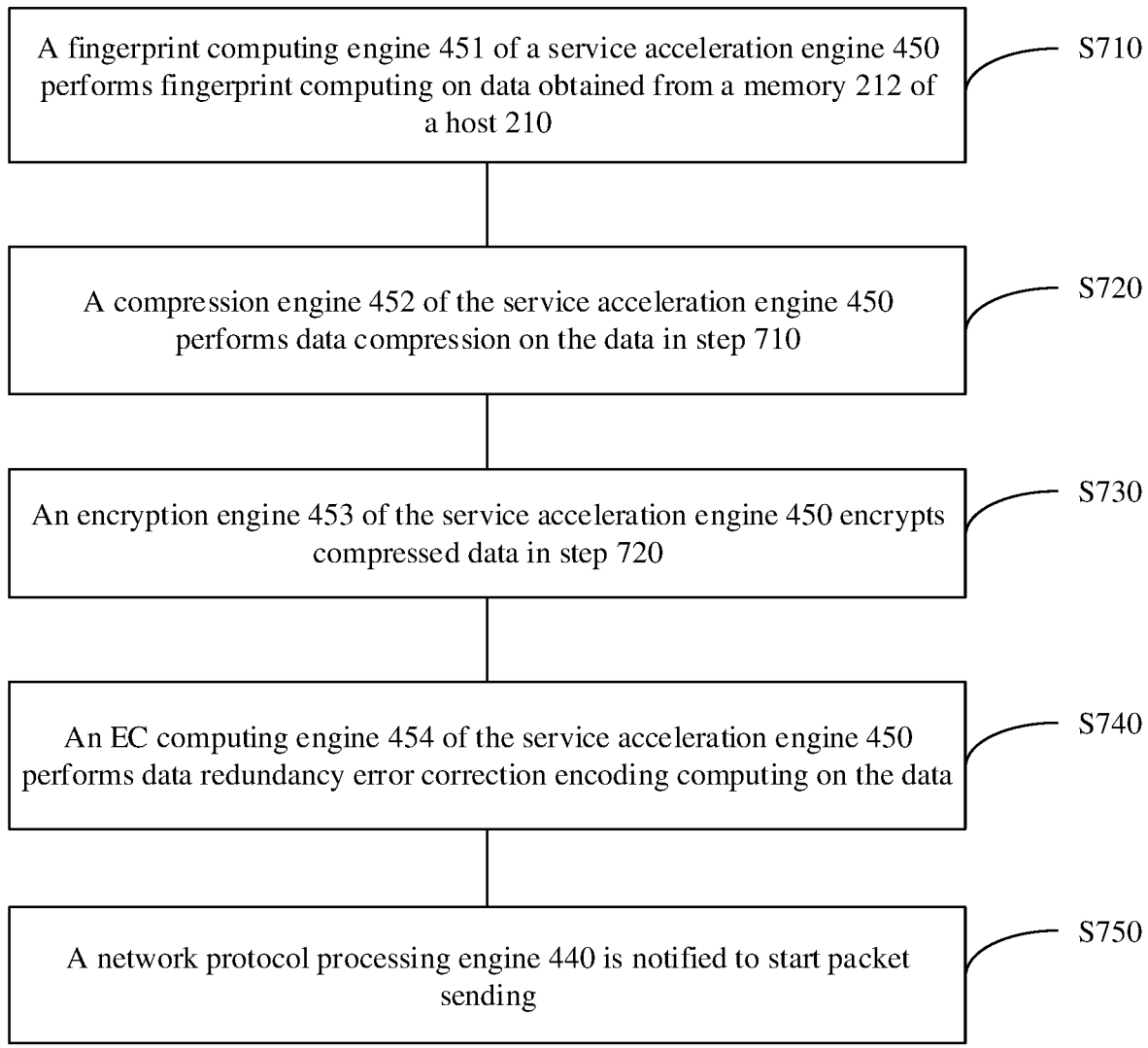
FIG. 7 is a schematic flowchart of a method for performing storage service processing on data by a service acceleration engine 450 according to an embodiment of this application.

The following describes in detail an implementation process of step 570 with reference to FIG. 7.

FIG. 7 is a schematic flowchart of a method for performing storage service processing on data by a service acceleration engine 450 according to an embodiment of this application. As shown in FIG. 7, the method includes steps 710 to 750. The following separately describes steps 710 to 750 in detail.

It should be understood that a process of storage service processing of the service acceleration engine 450 is not specifically limited in this embodiment of this application. The process may include any combination of one or more of the following: fingerprint computing, compression, encryption, EC computing, and the like.

For ease of description, in FIG. 7, the service acceleration engine 450 separately performs fingerprint computing, compression, encryption, and EC computing on the data, and then sends data to a corresponding destination storage device.

Step 710: The fingerprint computing engine 451 of the service acceleration engine 450 performs fingerprint computing on data obtained from the memory 212 of the host 210.

In an example, fingerprint computing may be performed according to a hash algorithm. For example, fingerprint computing may be performed on the data by using the SHA 256, to obtain a hash value of each data block, namely, a data fingerprint of each data block. A data fingerprint of a data block may be used for data deduplication processing.

In this embodiment of this application, data deduplication processing may be performed asynchronously. For example, the CPU core 430 may asynchronously assist in data deduplication processing.

For ease of understanding, the following first describes in detail an implementation process of data deduplication processing.

In a possible implementation, after the data plane offload engine 410 calculates the data fingerprint of each data block, the data plane offload engine 410 queries a deduplication database based on the data fingerprint of each data block. If a corresponding data address is present in the obtained data fingerprint of the data block, the CPU core 430 is notified of a query result, and the CPU core 430 performs subsequent deduplication processing. If the data address corresponding to the data fingerprint of the data block is not present in the deduplication database, it indicates that there is no duplicate new data, and the data fingerprint and the data address of the new data are inserted into the deduplication database.

In another possible implementation, after calculating the data fingerprint of each data block, the data plane offload engine 410 directly sends the data fingerprint of each data block to a CPU event notification queue, and the CPU core 430 performs fingerprint comparison and deduplication processing.

It should be understood that the data address is a storage address of the data, and is usually LUN+LBA.

Step 720: The compression engine 452 of the service acceleration engine 450 performs data compression on the data in step 710.

If data compression is enabled, the compression engine 452 performs compression processing to obtain compressed data. Because an actual data block of the compressed data is smaller, a compression status needs to be recorded in a message header. In this way, assembling may be performed based on the actually compressed data when a message is sent. This reduces network bandwidth consumption.

In an example, because data is stored in a form of blocks (for example, 512, 4 K), the compressed data may be recorded in a form of storage data blocks, and an idle part is padded with 0.

Step 730: The encryption engine 453 of the service acceleration engine 450 encrypts the compressed data in step 720.

If encryption is required, the encryption engine 453 obtains corresponding encryption information, and encrypts the data based on the encryption information. In an example, the encryption engine 453 may obtain the encryption information from the queue.

It should be understood that the encryption information is prepared by the CPU core 430 in step 560 during strip splitting and message encapsulation, and is placed in the queue. For example, the encryption information may include an encryption key and an information value (IV). The encryption key may be obtained by the CPU core 430 from a key server. The IV may be generated by the CPU core 430 through computing based on an LBA of the data block.

Step 740: The EC computing engine 454 of the service acceleration engine 450 performs data redundancy error correction encoding computing (for example, EC computing) on the data.

After the encryption engine 453 completes encryption processing on the data, the EC computing engine 454 may perform EC computing on the data. For example, the encryption engine 453 encrypts the M data blocks to obtain M encrypted data blocks, and the EC computing engine 454 performs EC computing on the M encrypted data blocks to obtain N redundant data blocks.

It should be understood that the N redundant data blocks are obtained by the EC computing engine 454 through computing based on the M encrypted data blocks. Therefore, the N redundant data blocks are also encrypted data.

Step 750: Notify the network protocol processing engine 440 to start to send a packet.

Because the network protocol processing engine 440 usually needs to establish a reliable data connection to each destination storage node based on a connection, an independent sending queue is usually required. There are a plurality of implementations herein, and the following separately describes different implementations in detail.

In a possible implementation, after completing data processing, each engine of the service acceleration engine 450 may notify the CPU core 430, and then the CPU core 430 places a message in the sending queue of the network protocol processing engine 440. In this implementation, the CPU core 430 needs to perform processing. Therefore, a delay is long and performance is poor.

In this time period, the CPU core 430 may perform deduplication processing synchronously or asynchronously. Synchronous deduplication means that if data blocks have a same fingerprint, data comparison is directly performed, and if the data blocks are the same, a duplicate data block is not delivered. Asynchronous deduplication means that data delivery is not affected, deduplication check is performed asynchronously, and if a data block is duplicate (a same fingerprint may not indicate same data, and therefore real comparison of the data blocks is usually needed), deletion of the corresponding data block is initiated. Asynchronous deduplication can avoid a delay caused by deduplication in a read/write process.

In another possible implementation, the data plane offload engine 410 directly places the message in the sending queue of the network protocol processing engine 440, and then indicates the network protocol processing engine 440 to perform processing. In this implementation, the CPU core 430 does not need to perform processing. Therefore, a delay is short and performance is better.

In this case, for deduplication processing, the data plane offload engine 410 needs to notify the CPU core 430, and the CPU core 430 asynchronously performs deduplication processing. If a block is new, fingerprint data and a data address are inserted into a fingerprint database. If it is detected that the data block is duplicate, after an address reference relationship is established, the CPU core 430 initiates a deletion command, and the data plane offload engine 410 notifies, based on a data block deletion procedure, a device that stores the duplicate block to delete the duplicate block. In this manner, an increase in a read/write delay caused by deduplication is avoided, and user experience is improved.

When the network protocol processing engine 440 sends a packet, because depths of sending queues are different, M+N data in a same batch of computing may not be sent immediately. To prevent data from being stored in the memory 222 of the network adapter 220, the following describes several possible implementations.

In a possible implementation, after calculating the N redundant data blocks based on the M data blocks, the EC computing engine 454 stores the N redundant data blocks in the memory 222 of the network adapter 220, and directly discards the remaining M data blocks. When the message is sent, the data plane offload engine 410 obtains the M data blocks from the memory 212 of the host 210 independently. In addition, the foregoing related processing is performed. In this implementation, the messages are separately sent and independently processed. Implementation is simple.

In another possible implementation, a buffer may be established in the memory 222 of the network adapter 220, and a cache (which may also be understood as a local area of the data plane offload engine 410) is established on a chip of the data plane offload engine 410. The N redundant data blocks obtained through EC computing are placed in the cache, and data in the cache is stored in the buffer of the memory 222 only when a cache conflict occurs. When the message is sent, the network protocol processing engine 440 reads data from the buffer. If the data is present in the cache, the data is directly read from the cache. Otherwise, the data is read from an external memory. After the message is sent successfully, the corresponding cache data is deleted, and the buffer is cleared.

In another possible implementation, the N redundant data blocks obtained through EC computing are stored in the memory 222 of the network adapter 220, and the remaining M data blocks are directly placed in a delayed-deletion linked list in the data plane offload engine 410, instead of being directly deleted.

Optionally, to enable the network protocol processing engine 440 to quickly search for stored data, a VF+address-based hash index may be established for the linked list. For simple implementation, a linked list of result areas is established in a sequence of addition based on a hash table with VF+address as key.

Optionally, in some embodiments, the linked list may be directly queried without establishing an index table.

When the buffer of the data plane offload engine is insufficient, data at the end of the delayed-deletion linked list is directly discarded. If there is an index table, corresponding records in the index table are deleted.

When the message is sent, the network protocol processing engine 440 first queries whether the data is present in the delayed-deletion linked list based on the VF+address. If present, the data is directly read from the delayed-deletion linked list. Otherwise, M data blocks are obtained again from the memory 212 of the host 210, and the foregoing data compression and encryption processes need to be performed again.

One I/O may include a plurality of strips, and one strip is one M+N. Only after data blocks of one M+N are sent to the destination storage device, the strip is completed. Similarly, after the plurality of strips are all sent to the destination storage device, the I/O is completed. Then, the network adapter 400 returns an I/O success response to the host.

Therefore, a smaller time interval for sending the M+N messages indicates better effect. Further, if the waiting time of the messages in the queue is shorter, the data in the foregoing other implementations is more likely to be stored in the chip. If the network protocol sending queue is empty, the message is immediately sent by the network protocol processing engine 440. The CPU core 430 may initiate EC computing and perform sending based on a depth of a corresponding sending queue of the network protocol processing engine 440. Messages in a shallow queue are sent prior to other queues. When the queue depth reaches a threshold, an EC computing API may stop being invoked, to reduce occupation of the buffer of the chip.

After completing packet encapsulation, the network protocol processing engine 440 sends the packet to the destination storage device, and completes writing I/O data into the destination storage device. After receiving a complete message indicating that all current I/O write strip data and corresponding EC redundant data are written into the storage device, the storage device returns an I/O write complete response to the host.

Figure 8:
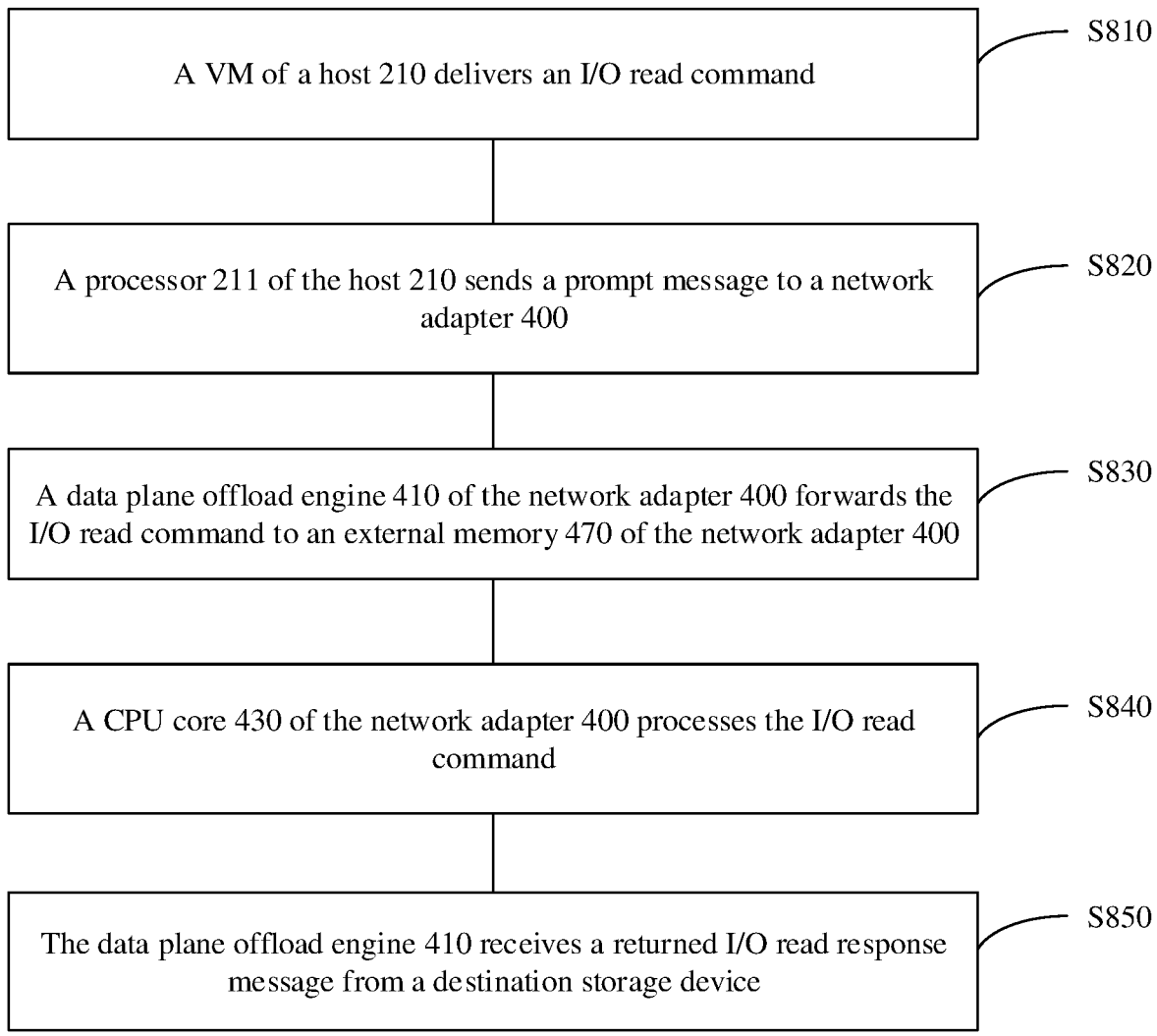
FIG. 8 is a schematic flowchart of a method for processing an I/O read command by a network adapter according to an embodiment of this application.

The following uses the hardware architecture shown in FIG. 4 as an example to describe in detail, with reference to an example in FIG. 8, an implementation in which a network adapter processes an I/O read command. It should be understood that the example in FIG. 8 is merely intended to help a person skilled in the art understand embodiments of this application, but is not intended to limit embodiments of this application to a specific value or a specific scenario in FIG. 8. It is clearly that a person skilled in the art can make various equivalent modifications or changes based on the provided example, and such modifications and changes also fall within the scope of embodiments of this application.

FIG. 8 is a schematic flowchart of a method for processing an I/O read command by a network adapter according to an embodiment of this application. As shown in FIG. 8, the method may include steps 810 to 850. The following separately describes steps 810 to 850 in detail.

Step 810: A VM of the host 210 delivers an I/O read command.

The I/O read command indicates to obtain to-be-read data from a destination storage device and store the data in the host 210. For example, the data may be stored in a memory corresponding to the VM that is in the host 210 and that delivers the I/O read command.

Step 820: The processor 211 of the host 210 sends a prompt message to the network adapter 400.

Step 830: The data plane offload engine 410 of the network adapter 400 forwards the I/O read command to the external memory 470 of the network adapter 400.

Step 840: The CPU core 430 of the network adapter 400 processes the I/O read command.

Software on the CPU core 430 analyzes the I/O read command. The I/O read command may generally include read information of the destination storage device. The information of the storage device includes but is not limited to information such as a LUN, an LBA, a data size, and a VF+SG list of a memory locally storing data in the host 210.

For I/O read, the VF+SG information indicates locations in a memory of the host 210 into which data read from the destination storage device is written.

In this embodiment of this application, the CPU core 430 may split the I/O read command based on address information and length information (an SG list) that are of the data read from the destination storage device and that are written into the memory of the host 210, to obtain a plurality of I/O read messages. Each of the plurality of I/O read messages includes information that is of each piece of the data read from the destination storage device and that is written into the memory of the host 210.

It should be understood that the information that is of each piece of the data and that is written into the memory of the host 210 includes any one of the following: address information and length information (an SG list) that are of each piece of the data and that are written into the memory of the host 210; or address information and length information that are of each piece of the data and that are written into the memory of the host 210 and information (a VF+SG list) of the VM that is in the host 210 and that delivers the I/O read command; or a first identifier ID and offset information that is of the data and that is written into the memory of the host 210. The first ID indicates the information of the VM that is in the host 210 and that delivers the I/O read command and a plurality of groups of address information and length information (an SG list) that are of the data and that are written into the VM.

Step 825: The CPU core 430 indicates the network protocol processing engine 440 to send a message packet to a remote destination storage device.

After completing processing the I/O read command, the CPU core 430 may indicate the network protocol processing engine 440 to send the plurality of I/O read messages to a plurality of remote destination storage devices. The message may include a message header. The message header may carry storage address information of a corresponding destination storage device. The information may generally be a sending queue of a network connection.

The CPU core 430 may further notify the network protocol processing engine 440 to initiate network protocol sending processing, and the network protocol processing engine 440 sends an I/O read message packet to a corresponding destination storage device.

Step 850: The data plane offload engine 410 receives a returned I/O read response message from the destination storage device.

The destination storage device may read corresponding storage data based on storage address information in the I/O read message packet, and feed back the storage data to the data plane offload engine 410 by using the I/O read response message. The I/O read response message may include data written into the memory 212 of the host 210, decryption information, decompression information, and the like.

The I/O read response message may be understood as a response packet fed back by the destination storage device for the received I/O read command.

If data in the I/O read response message is encrypted data, the decryption engine 455 of the data plane offload engine 410 may decrypt the data in the I/O read response message based on the decryption information, to obtain before-encryption data.

If data in the I/O read response message is compressed data, the decompression engine 456 of the data plane offload engine 410 may further perform decompression processing on the data in the I/O read response message based on the decompression information, to obtain before-compression data.

It should be noted that, for I/O read, strip data needs to be obtained from a plurality of destination storage devices, and combined into complete I/O data. Read is an inverse process of write. The difference is that EC computing is not required when data is correct. The reason is that proper data needs to be restored from redundant data only when data is incorrect.

After performing the foregoing processing on the data in the read response message, the data plane offload engine 410 may directly write the data into a host/VM memory indicated by VF+SG.

In the foregoing technical solution, data is read at a time to complete all storage service processing. This avoids bandwidth consumption and delay caused by repeatedly invoking an acceleration module and repeatedly performing CPU processing in a common manner. Data does not need to be sent to the memory of the network adapter. This greatly reduces a bandwidth requirement between a data plane and the memory of the network adapter CPU, reduces costs, and improves performance.

An embodiment of this application further provides a chip. The chip obtains instructions and executes the instructions to implement the foregoing methods.

Optionally, in an implementation, the chip includes a processor and a data interface. The processor reads, through the data interface, instructions stored in a memory, to perform the foregoing methods.

Optionally, in an implementation, the chip may further include a memory. The memory stores instructions, a processor is configured to execute the instructions stored in the memory. When the instructions are executed, the processor is configured to perform the foregoing methods.

An embodiment of this application further provides a computer-readable storage medium. The computer-readable storage medium stores instructions. The instructions are used to implement the methods in the foregoing method embodiments.

An embodiment of this application further provides a computer program product including instructions. The instructions are used to implement the methods in the foregoing method embodiments.

In an example of implementation, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor, or the like.

In an example of implementation, the memory may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through an example rather than a limitative description, random access memories (RAM) in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

The term "and/or" in this specification describes only an association relationship between associated objects and represents that three relationships may exist. For example, A and/or B may represent the following three cases: Only A exists, both A and B exist, and only B exists, where A and B may be singular or plural. In addition, the character "/" in this specification usually represents an "or" relationship between the associated objects, or may represent an "and/or" relationship. A specific meaning depends on a context.

"A plurality of" in this application refers to two or more than two. At least one of the following items (pieces) or a similar expression thereof refers to any combination of these items, including any combination of singular items (pieces) or plural items (pieces). For example, at least one item (piece) of a, b, or c may indicate a, b, c, a and b, a and c, b and c, or a, b, and c, where a, b, and c may be singular or plural.

Sequence numbers of the foregoing processes do not mean execution sequences in embodiments of this application. The execution sequences of the processes should be determined based on functions and internal logic of the processes, and should not be constructed as any limitation on the implementation processes of embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes various media that can store program code, such as a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network adapter, wherein the network adapter comprises:
   at least one processor;
   a hardware processing engine; and
   one or more memories coupled to the at least one processor and storing a first set of programming instructions for execution by the at least one processor to:

obtain a first input/output (I/O) command, wherein the first I/O command indicates to write first data stored in a local server into at least one peer server, and wherein the first I/O command comprises address information and length information of the first data;

split the first data based on the address information and the length information of the first data to obtain a plurality of groups of address information and length information; and send first indication information to the hardware processing engine, wherein the first indication information indicates the hardware processing engine to obtain the first data from the local server, and the first indication information comprises the plurality of groups of address information and length information;

wherein the one or more memories are coupled to the hardware processing engine and store a second set of programming instructions for execution by the hardware processing engine to:

when the first data is obtained from the local server based on the address information and the length information, directly process the first data; and send the processed first data to the at least one peer server, wherein the first data is not stored in the one or more memories of the network adapter.

2. The network adapter according to claim 1, wherein:

the first indication information further indicates the hardware processing engine to perform any combination of one or more of the following processing on the first data: data fingerprint computing, data deduplication processing, data encryption, data compression, or data redundancy error correction encoding computing; and the one or more memories store the second set of programming instructions for execution by the hardware processing engine to: when the first data is obtained from the local server based on the address information and the length information, directly process the first data based on the first indication information.

3. The network adapter according to claim 2, wherein:

the first indication information indicates the hardware processing engine to perform fingerprint computing on the first data;

the one or more memories store the second set of programming instructions for execution by the hardware processing engine to:

perform fingerprint computing on the first data, to obtain fingerprint information corresponding to the first data; and send the fingerprint information corresponding to the first data to the at least one processor; and the one or more memories store the first set of programming instructions for execution by the at least one processor to perform deduplication processing based on the fingerprint information corresponding to the first data.

4. The network adapter according to claim 1, wherein:

the one or more memories store the second set of programming instructions for execution by the hardware processing engine to: after the first data is processed, place the processed first data into a sending queue of the hardware processing engine, and send the processed first data to the at least one peer server; and the one or more memories store the first set of programming instructions for execution by the at least one processor to: in response to determining that the first data comprises duplicate data, send, by using the hardware processing engine, second indication information to a peer server that stores the duplicate data, wherein the second indication information is used to delete the duplicate data.

5. The network adapter according to claim 1, wherein:

the one or more memories store the second set of programming instructions for execution by the hardware processing engine to: after the first data is processed, send a notification message to the at least one processor, wherein the notification message is used to notify the at least one processor to send the first data; and the one or more memories store the first set of programming instructions for execution by the at least one processor to: when the processed first data is placed into a sending queue of the hardware processing engine, and in response to determining that the first data comprises duplicate data, skip delivering the duplicate data to the sending queue; or after the processed first data is placed into a sending queue of the hardware processing engine, and in response to determining that the first data comprises duplicate data, send, by using the hardware processing engine, second indication information to a peer server that stores the duplicate data, wherein the second indication information is used to delete the duplicate data.

6. The network adapter according to claim 1, wherein:

the processed first data comprises the processed first data and redundancy error correction data corresponding to the processed first data, the redundancy error correction data is stored in the one or more memories of the network adapter, and the processed first data is not stored in the one or more memories of the network adapter; and the one or more memories store the second set of programming instructions for execution by the hardware processing engine to:

obtain the redundancy error correction data from the one or more memories of the network adapter;

obtain the processed first data again from the local server; and send the processed first data and the redundancy error correction data to the at least one peer server.

7. The network adapter according to claim 1, wherein:

the processed first data comprises the processed first data and redundancy error correction data corresponding to the processed first data, the redundancy error correction data is stored in the one or more memories of the network adapter, and the processed first data is stored in a local area of the hardware processing engine; and the one or more memories store the second set of programming instructions for execution by the hardware processing engine to:

obtain the redundancy error correction data from the one or more memories of the network adapter;

obtain the processed first data from the local area; and send the processed first data and the redundancy error correction data to the at least one peer server.

8. The network adapter according to claim 1, wherein:

the one or more memories store the first set of programming instructions for execution by the at least one processor to receive a first I/O read response message from a peer server, wherein the first I/O read response message comprises second data that the local server needs to obtain from the peer server; and the one or more memories store the second set of programming instructions for execution by the hardware processing engine to:

process the second data; and
directly write the processed second data into the local server, wherein the second data is not stored in the one or more memories of the network adapter.

9. The network adapter according to claim 8, wherein the one or more memories store the second set of programming instructions for execution by the hardware processing engine to determine to perform any combination of one or more of the following processing on the second data: data fingerprint computing, data deduplication processing, data decryption, or data decompression.

10. The network adapter according to claim 9, wherein:
the first I/O read response message carries decryption information; and
the one or more memories store the second set of programming instructions for execution by the hardware processing engine to determine, based on the decryption information, to decrypt the second data.

11. A data processing method of a network adapter, wherein the network adapter comprises a processor and a hardware processing engine; and the data processing method comprises:
obtaining, by the processor of the network adapter, a first input/output (I/O) command, wherein the first I/O command indicates to write first data stored in a local server into at least one peer server, and wherein the first I/O command comprises address information and length information of the first data;
splitting, by the processor of the network adapter, the first data based on the address information and the length information of the first data to obtain a plurality of groups of address information and length information; and
sending, by the processor of the network adapter, first indication information to the hardware processing engine, wherein the first indication information indicates the hardware processing engine to obtain the first data from the local server, and the first indication information comprises the plurality of groups of address information and length information; and
when the first data is obtained from the local server based on the address information and the length information:
directly processing, by the hardware processing engine of the network adapter, the first data; and
sending, by the hardware processing engine, processed first data to the at least one peer server, wherein the first data is not stored in a memory of the network adapter.

12. The data processing method according to claim 11, wherein:
the first indication information further indicates the hardware processing engine to perform any combination of one or more of the following processing on the first data: data fingerprint computing, data deduplication processing, data encryption, data compression, or data redundancy error correction encoding computing; and
the directly processing, by the hardware processing engine of the network adapter, the first data when the first data is obtained from the local server based on the address information and the length information comprises:
when the first data is obtained from the local server based on the address information and the length information, directly processing, by the hardware processing engine of the network adapter, the first data based on the first indication information.

13. The data processing method according to claim 12, wherein:
the first indication information indicates the hardware processing engine to perform fingerprint computing on the first data; and
the directly processing, by the hardware processing engine of the network adapter, the first data when the first data is obtained from the local server based on the address information and the length information comprises:
performing, by the hardware processing engine of the network adapter, fingerprint computing on the first data, to obtain fingerprint information corresponding to the first data;
sending, by the hardware processing engine of the network adapter, the fingerprint information corresponding to the first data to the processor; and
performing, by the processor of the network adapter, deduplication processing based on the fingerprint information corresponding to the first data.

14. The data processing method according to claim 11, wherein the data processing method further comprises:
after the first data is processed, placing, by the hardware processing engine of the network adapter, the processed first data into a sending queue of the hardware processing engine;
sending, by the hardware processing engine, the processed first data to the at least one peer server; and
in response to determining that the first data comprises duplicate data, sending, by the processor of the network adapter by using the hardware processing engine, second indication information to a peer server that stores the duplicate data, wherein the second indication information is used to delete the duplicate data.

15. The data processing method according to claim 11, wherein the data processing method further comprises:
after the first data is processed, sending, by the hardware processing engine of the network adapter, a notification message to the processor, wherein the notification message is used to notify the processor to send the first data; and
when the processed first data is placed into a sending queue of the hardware processing engine, and in response to determining that the first data comprises duplicate data, skipping delivering, by the processor of the network adapter, the duplicate data to the sending queue; or
after the processed first data is placed into a sending queue of the hardware processing engine, and in response to determining that the first data comprises duplicate data, sending, by the processor of the network adapter by using the hardware processing engine, second indication information to a peer server that stores the duplicate data, wherein the second indication information is used to delete the duplicate data.

16. The data processing method according to claim 11, wherein:
the processed first data comprises the processed first data and redundancy error correction data corresponding to the processed first data, the redundancy error correction data is stored in the memory of the network adapter, and the processed first data is not stored in the memory of the network adapter; and
the data processing method further comprises:
obtaining, by the hardware processing engine of the network adapter, the redundancy error correction data from the memory of the network adapter;

obtaining, by the hardware processing engine, the processed first data again from the local server; and sending, by the hardware processing engine of the network adapter, the processed first data and the redundancy error correction data to the at least one peer server.

17. The data processing method according to claim 11, wherein:

the processed first data comprises the processed first data and redundancy error correction data corresponding to the processed first data, the redundancy error correction data is stored in the memory of the network adapter, and the processed first data is stored in a local area of the hardware processing engine; and the data processing method further comprises:

obtaining, by the hardware processing engine of the network adapter, the redundancy error correction data from the memory of the network adapter;

obtaining, by the hardware processing engine, the processed first data from the local area; and sending, by the hardware processing engine of the network adapter, the processed first data and the redundancy error correction data to the at least one peer server.

18. The data processing method according to claim 11, wherein the data processing method further comprises:

receiving, by the processor of the network adapter, a first I/O read response message from a peer server, wherein the first I/O read response message comprises second data that the local server needs to obtain from the peer server; and processing, by the hardware processing engine of the network adapter, the second data, and directly writing, by the hardware processing engine, processed second data into the local server, wherein the second data is not stored in the memory of the network adapter.

19. The network adapter according to claim 3, wherein performing the fingerprint computing on the first data to obtain fingerprint information corresponding to the first data comprises:

computing a hash value of each data block of the first data.

20. The data processing method according to claim 13, wherein performing the fingerprint computing on the first data to obtain fingerprint information corresponding to the first data comprises:

computing a hash value of each data block of the first data.

* * * * *